Oct. 29, 1929.  E. N. ROTH  1,733,390
HOSE COUPLER
Filed June 11, 1926  2 Sheets-Sheet 1
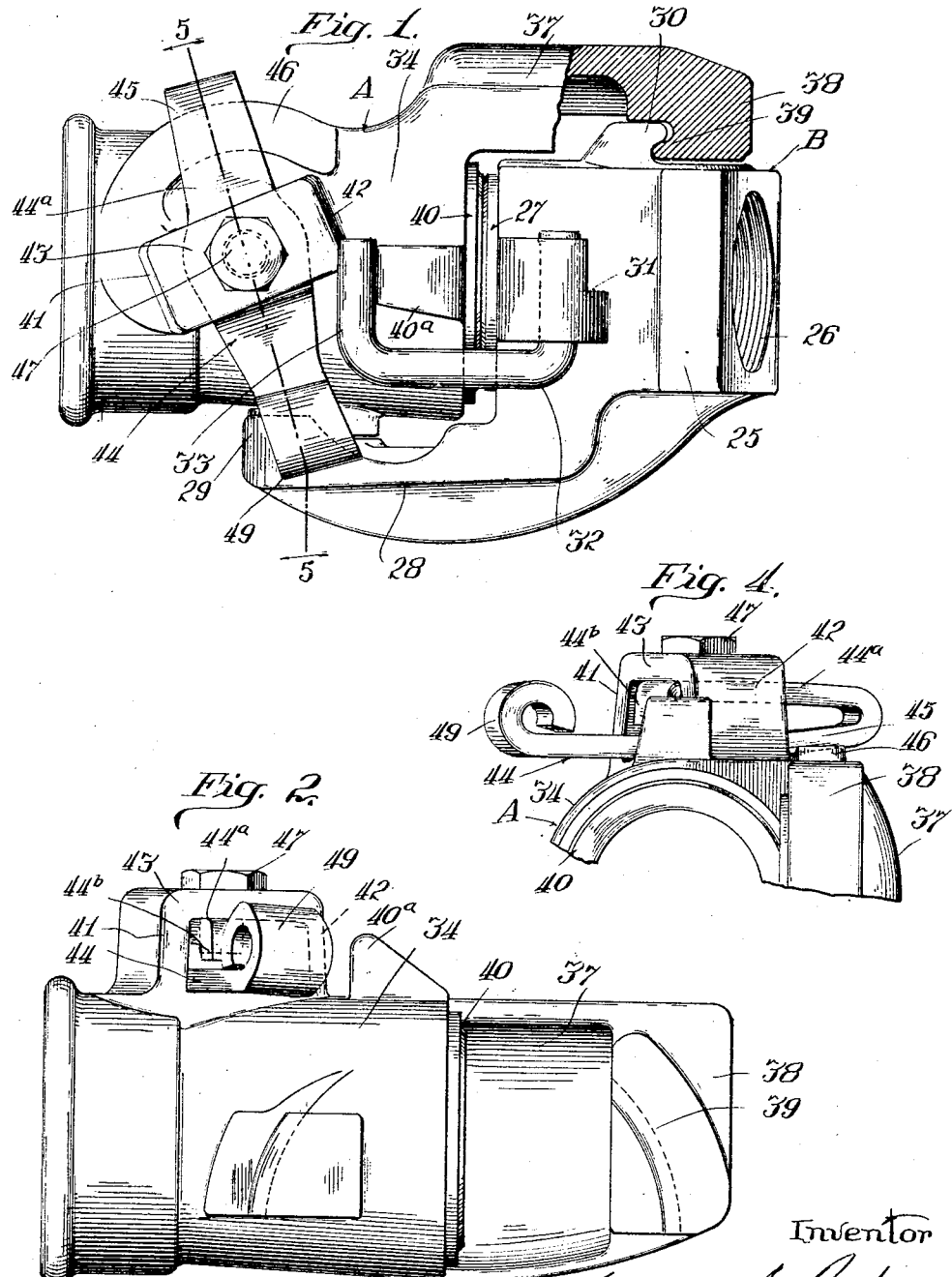
Inventor
Edward N. Roth.
By Barnett & _____
Attorneys Oct. 29, 1929.  E. N. ROTH  1,733,390
HOSE COUPLER
Filed June 11, 1926  2 Sheets-Sheet 2
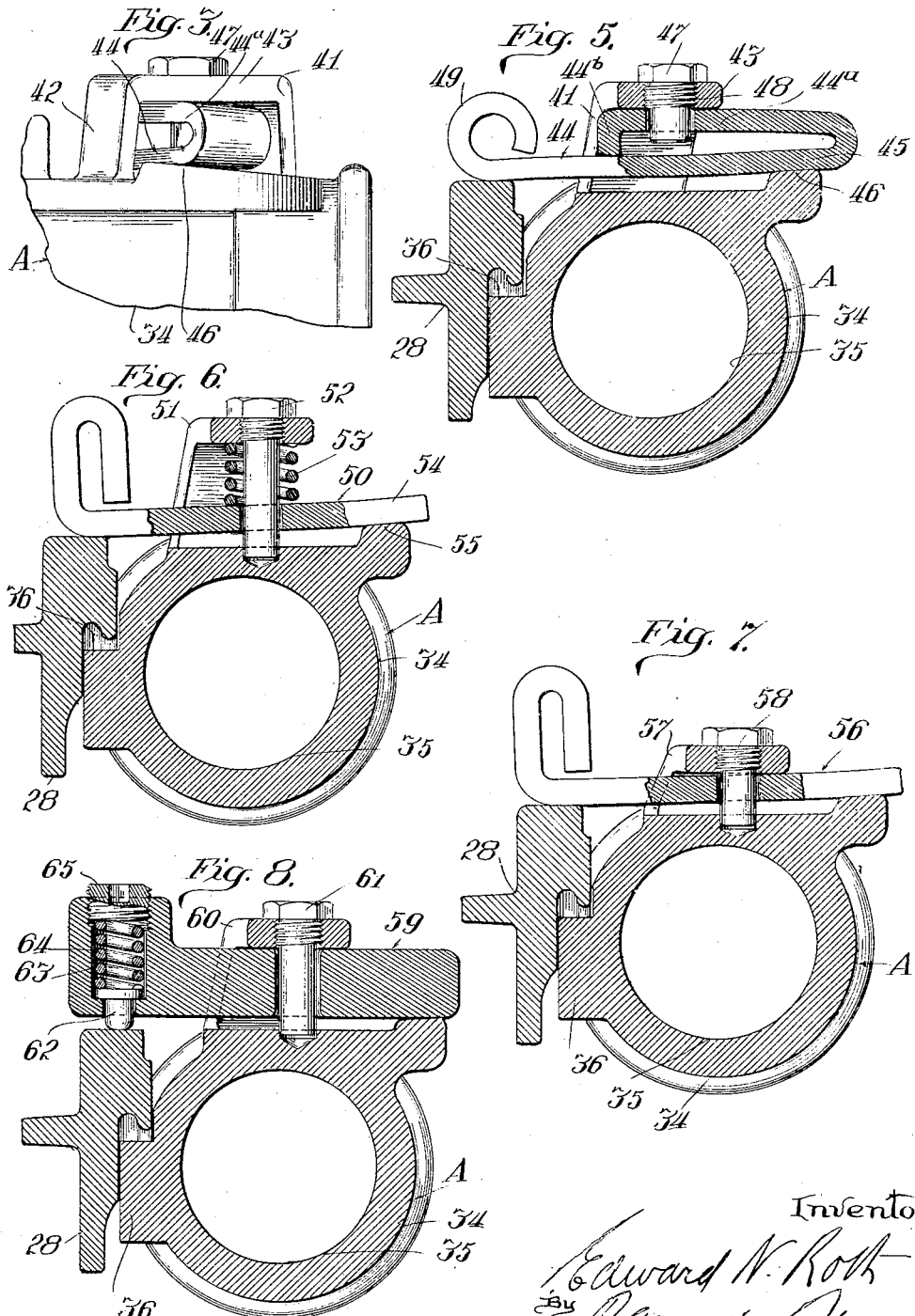

Patented Oct. 29, 1929

1,733,390

UNITED STATES PATENT OFFICE

EDWARD N. ROTH, OF CHICAGO, ILLINOIS, ASSIGNOR TO ROTH MANUFACTURING COMPANY, OF CHICAGO, ILLINOIS, A CORPORATION OF ILLINOIS

HOSE COUPLER

Application filed June 11, 1926. Serial No. 115,208.

My invention relates to hose couplings for connecting together the hoses or equivalent flexible metallic structures on the train pipes —steam or air—of railway cars; and the object of the invention is to provide, more particularly in couplings for steam train pipe connections, new and improved means for locking together the couplers or mating members of the coupling.

It has been customary to provide couplers with locking devices of one sort or another which are forced under pressure by means of engaging wedge surfaces against the arms of the mating couplers to hold the couplers in locked relation as against the tendency to be rocked on their cams and disengaged by pull on the hoses when the train rounds a curve, for example. These positive wedge locks are effective so far as this purpose is concerned, but the pressure from the wedges, especially as the locks are frequently driven into place by a hammer, is likely, in case at least of certain types of wedge locks, to injure the gaskets and also to strain or bend the coupler arms and mutilate the cams. A primary object of my present invention is to provide a wedge lock which will yield so that injury to the couplers and gasket is prevented and the efficiency of the lock increased, and its manipulation made easier.

The invention is illustrated in a preferred embodiment and in certain modifications thereof, in the accompanying drawings, wherein Fig. 1 is a plan view of a hose coupler constructed in accordance with my invention and shown as mated with a coupler of known construction.

Fig. 2 is a side elevation of the improved coupler shown in Fig. 1.

Fig. 3 is a fragmentary side elevation of the coupler to show the wedge surface engaged by the locking member.

Fig. 4 is a fragmentary view of the improved coupler of the present invention, looking toward the end of the same provided with the gasket.

Fig. 5 is a cross sectional view on line 5—5 of Fig. 1, and

Figs. 6, 7 and 8 are similar views illustrating possible modifications in the construction of the locking device as illustrated in Fig. 5.

Referring to the drawings, I have shown for the purpose of illustrating a typical application of the invention, a hose coupling consisting of two members or couplers A and B; coupler A being provided with the lock of my present invention, and the coupler B being a hose coupler of known type. The coupler of my invention is designed, in fact, so that it will mate with any of the different types of so-called gravity hose couplers now in use on steam railroads in this country for making the connection between the steam train pipes on adjacent cars of railroad trains; coupler B being shown as typical or illustrative of couplers of this general class of which there are several different makes. Coupler B consists of a head 25 formed with the steam port 26, in which is arranged a gasket 27, with a forwardly projecting arm 28 provided with an undercut lug or so-called cam 29 and, on the other side of the head from arm 28 with a cam lug 30. Projecting from the top of head 25 is a lug 31 in which is pivoted a locking link 32 the angularly disposed end 33 of which is adapted to engage with a lug on the mating coupler corresponding to lug 31.

The coupler A is shown as having the following construction: The head 34 of the coupler is formed with a port 35. On one side of the coupler head is the usual undercut lug or cam 36 adapted to be engaged by the cam 29, for example, of coupler B. The arm of coupler A consists of a curved or concavo-convex web 37 terminating in a thickened portion 38 provided with a cam 39 for engagement with the cam 30 on the head of coupler B. A gasket 40 is suitably arranged in a gasket seat at the outer end of port 35. The novel features of the coupler A, just referred to, are not claimed herein as they are the invention of and are claimed in an application of Egbert H. Gold and Edward A. Russell, Serial No. 117,431, filed June 21, 1926, now Patent No. 1,681,729, granted August 21, 1928. Coupler A may be provided with an upstanding lug 40$^a$ adapted to be engaged by the locking link 32 of a coupler of the type exemplified by coupler B.

Coupler A is provided, in accordance with my invention, with a locking device constructed, preferably, as follows: Arranged diagonally on the top of and preferably cast integral with the head 34 is a housing or bracket consisting of upright members 41, 42 and a connecting member 43, to which latter is pivoted a locking bar 44 made of steel so as to be somewhat resilient. One end of the bar is bent over on itself so that it has a U or V shape and this return bent portion 45 bears upon an arcuate wedge surface 46 which is preferably formed on the top of the head (Fig. 4). The locking bar extends through the housing or bracket 41, 42, 43 and is pivoted thereto by a pivot stud 47 fixed in a threaded perforation 48 in the horizontal member 43 of the bracket and having an unthreaded end extending through a slightly larger perforation in the upper leaf or bent over end 44ᵃ of the locking bar. The other end of the locking bar is preferably bent over at 49 to form a head and this end of the bar is arranged so that it will bear upon the upper surface of the arm of a mating coupler, for example, upon the arm 28 of the coupler B. The free end of the upper leaf 44ᵃ of the locking bar is bent downwardly to form a lug or projection 44ᵇ which engages an intermediate portion of the lower leaf 44 of the locking bar, when driven to locking position as shown in Fig. 5, and as hereinafter described. When the coupler is disengaged and the locking bar is released, the upper and lower leaves of the locking bar will spring apart, bringing the lower leaf away from the lug 44ᵇ as shown in Fig. 4.

When a pair of mating couplers are united, the locking bar is rotated, for example, by striking the head 49 with a hammer, and the end 45 of the bar rides up the wedge surface 46 thus forcing the other end of the locking bar downwardly so that it exerts a pressure on the arm 28 of the mating coupler. During the first portion of this engagement the locking bar will yield, throughout its length, to permit the parts to become properly adjusted without danger of the gasket being crushed or the coupler arm being bent. After the first part of the engagement takes place, the lower leaf of the locking bar will be brought up into contact with the lug 44ᵇ, and after this the locking member will act as a substantially rigid bar except for the resilience in the short end of bar 44 beyond the lug 44ᵇ, and the resilience in the return bent end 45. In this final position the locking bar will be substantially stiff but will be capable of yielding sufficiently to prevent damaging the gaskets or the coupler arm in case the locking bar is driven too far, or too violently into locking position.

In Figs. 6, 7, and 8 are illustrated three modified locking devices differently constructed from that just described, but operating on the same principle. In Fig. 6 the locking bar 50 may or may not be of resilient metal. It is pivoted in the bracket 51 by means of a stud 52 and a coiled spring 53 is interposed between the locking bar and the bracket which spring will yield to a certain extent as the bar is rotated and its end 54 rides up the wedge surface 55.

In the construction shown in Fig. 7 the locking bar 56 is of spring steel and extends under the bracket 57 to which it is pivoted by stud 58.

In the construction shown in Fig. 8 the locking bar 59 may be substantially rigid and is pivoted to the bracket 60 by stud 61 and is provided at the end overhanging the arm 28 of the mating coupler with a plunger 62 to bear on the upper surface of said arm, the plunger being arranged in a recess 63 in the locking bar and subject to the pressure of a coiled spring 64 held in the recess by a plug 65.

While I have shown my invention as embodied in a preferred construction and in certain suggested modifications thereof, I wish to be understood as covering all structural variations within the scope of the appended claims.

I claim:

1. A hose coupler comprising a head having a wedge surface and a projecting arm, and a resilient locking bar swivelled on the head so as to bear yieldingly when in locking position against said wedging surface and the arm of the mating coupler.

2. In combination, a hose coupler comprising a head having a wedge surface and a projecting arm, the head and arm provided with cams adapted to engage with cams on the arm and head respectively of a mating coupler, and a yieldable locking member loosely pivoted on the head of the coupler so that it may tilt at an angle to the plane of rotation and formed so as to bear yieldingly when in locking position against said wedging surface, and against the arm of the mating coupler.

3. In combination, a hose coupler comprising a head and a projecting arm to engage the arm and head, respectively, of a mating coupler, and a resilient metal locking member revolubly supported on the head of the coupler so that one end may be swung into and out of engagement with the arm of said mating coupler, the locking member being yieldable when in locking position in a plane at right angles to the plane in which it swings.

4. In combination, a hose coupler comprising a head and a projecting arm to engage the arm and head, respectively, of a mating coupler, and a resilient metal locking member revolubly supported on the head of the coupler so that one end may bear against the arm of said mating coupler, and a wedge surface on the coupler head against which the other end of the locking member bears.

5. In combination, a coupler comprising a head and a projecting arm, an arcuate wedging surface on the head, a bracket on the head and a locking member loosely pivoted at a point intermediate its ends to the bracket so that it may both rotate and tilt at an angle to its plane of rotation, said locking member being yieldable so as to bear at opposite ends yieldingly on said wedging surface and the arm of a mating coupler.

6. In combination, a coupler comprising a head and a projecting arm, an arcuate wedging surface on the head, a bracket on the head, and a resilient locking bar pivoted at a point intermediate its ends to the bracket and bearing at opposite ends on said wedging surface and the arm of a mating coupler.

7. In combination, a coupler comprising a head and a projecting arm, an arcuate wedging surface on the head, a bracket on the head, and a resilient return bent locking bar pivoted to said bracket and bearing at opposite ends on said wedging surface and on the arm of a mating coupler.

8. In combination, a coupler comprising a head and a projecting arm, an arcuate wedging surface on the head, a bracket on the head consisting of spaced upright members and a connecting member, and a resilient return bent locking bar, the return bent portion of which extends through and is pivoted to the bracket and bears upon said wedging surface, the other end of which is adapted to bear against the arm of a mating coupler.

9. In combination, a coupler comprising a head and a projecting arm, a wedging surface on the head, a bracket on the head, and a resilient return bent locking bar the upper leaf of which is pivoted in the bracket, the return bent portion adapted to engage the wedging surface, and the free end of the lower leaf bearing upon the arm of a mating coupler.

10. In combination, a coupler comprising a head and a projecting arm, a wedging surface on the head, a bracket on the head, and a resilient return bent locking bar, one leaf of which is pivoted in the bracket, the return bent portion adapted to engage the wedging surface, and the free end of the other leaf bearing upon the arm of a mating coupler.

11. In combination, a coupler comprising a head and a projecting arm, a wedging surface on the head, a bracket on the head, and a resilient return bent locking bar, the upper leaf of which is intermediately pivoted in the bracket and has its free end bent dowwardly to form a lug, the return bent portion of the bar being adapted to engage the wedging surface, and the free end of the lower leaf bearing upon the arm of a mating coupler, the lower leaf being intermediately engaged by the lug.

12. A hose coupler having a wedge surface and a resilient locking bar mounted on the coupler and adapted to be moved into locking engagement with the wedge surface and a portion of a mating coupler, so as to bear yieldingly on the wedge surface and mating coupler while in locking position.

13. In combination with a hose coupler, a resilient locking bar, a pivot pin carried by the coupler and loosely engaging the bar at a point intermediate its length so that the bar may rotate and tilt at an angle to its plane of rotation, said bar being adapted when in locking position to bear at one end against said coupler and at its other end against a mating coupler so as to lock said couplers together with yielding pressure.

EDWARD N. ROTH.